United States Patent [19]

Sugiura et al.

[11] 4,168,893
[45] Sep. 25, 1979

[54] EXPOSURE CONTROL DEVICE FOR CAMERA

[75] Inventors: Yoji Sugiura; Tokuichi Tsunekawa, both of Yokohama; Tetsuya Taguchi, Kawasaki, all of Japan

[73] Assignee: Canon Kabushiki Kaisha, Tokyo, Japan

[21] Appl. No.: 825,705

[22] Filed: Aug. 18, 1977

[30] Foreign Application Priority Data

Sep. 3, 1976 [JP] Japan .................................. 51/105460

[51] Int. Cl.² ............................................... G03B 7/00
[52] U.S. Cl. ...................................................... 354/61
[58] Field of Search ...................... 354/39, 57, 61, 156

[56] References Cited
U.S. PATENT DOCUMENTS

| 2,938,440 | 5/1960 | Bretthauer et al. | 354/39 |
| 3,078,772 | 2/1963 | Goshima | 354/39 |
| 3,257,922 | 6/1966 | Maitani | 354/156 |
| 3,262,380 | 7/1966 | Winkler | 354/39 |
| 3,714,878 | 2/1973 | Hasegawa et al. | 354/152 X |
| 3,785,266 | 1/1974 | Watanabe | 354/61 X |
| 4,062,028 | 12/1977 | Tezuka et al. | 354/152 |

FOREIGN PATENT DOCUMENTS 1146065  3/1969  United Kingdom ..................... 354/156

Primary Examiner—John Gonzales
Attorney, Agent, or Firm—Toren, McGeady and Stanger

[57] ABSTRACT

An exposure control device for a single lens reflex camera has an exposure calculating mechanism for determining the amount of exposure in accordance with desired shutter time, aperture value, film sensitivity and brightness of the object to be photographed. The exposure calculating mechanism is carried along one external wall of a casing for the reflex mirror of the camera.

4 Claims, 3 Drawing Figures

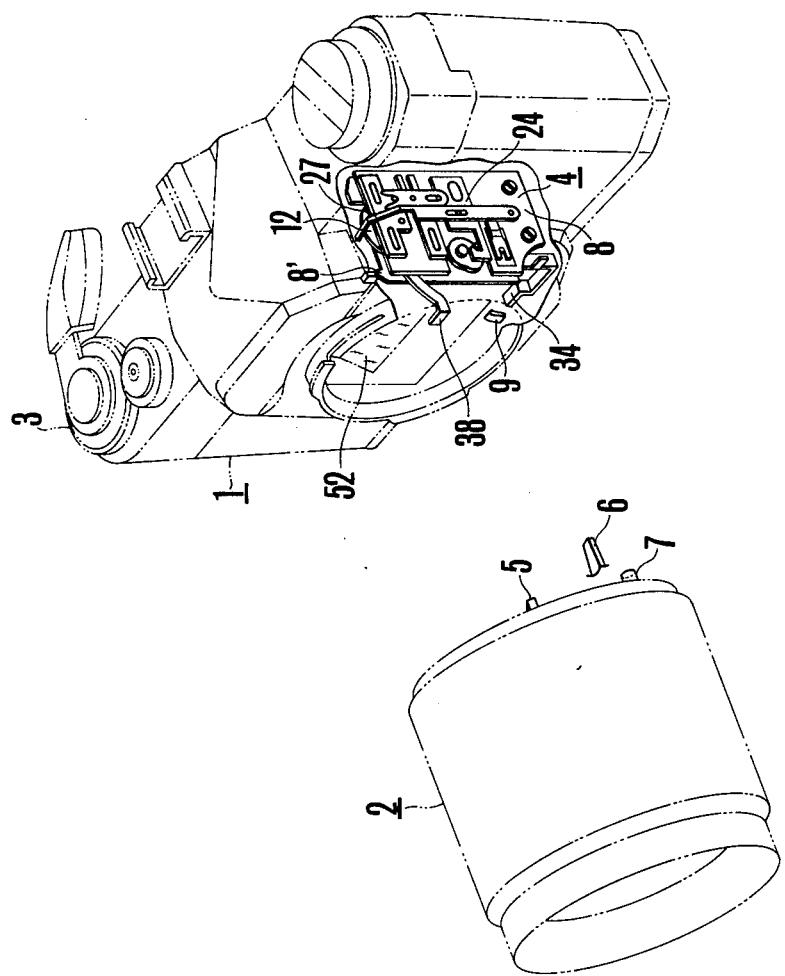

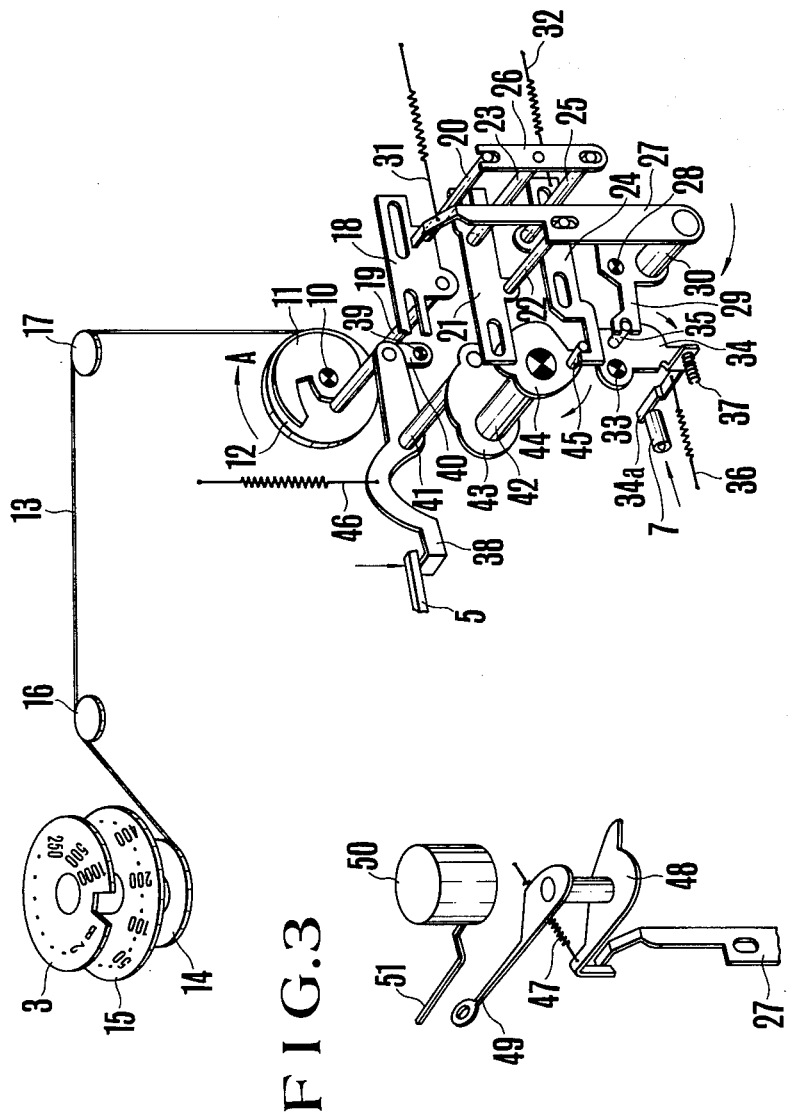

EXPOSURE CONTROL DEVICE FOR CAMERA

BACKGROUND OF THE INVENTION

The present invention relates generally to cameras and more particularly to an exposure control device.

A camera so designed that by measuring the brightness of the object to be photographed with a TTL system the aperture value or the shutter time is determined in accordance with the film sensitivity and the set shutter time respectively, the set aperture value is conventionally known. In of a conventional single lens reflex camera whose lenses are interchangeable usually the shutter time setting dial is provided on the upper part of the camera while the aperture value setting ring is provided around the lens barrel so that the mechanism for operatively engaging them with each other becomes unavoidably complicated and necessitates a larger space for mounting in the camera. Particularly when such a single lens reflex camera as mentioned above is so designed that the brightness of the object to be photographed with the totally opened diaphragm, it is necessary to compensate the measured brightness, taking the smallest F-value of the photographic lens and the measurement error due to the smallest F-value into consideration. A camera having a compensating device for the above error is disclosed in U.S. Pat. No. 3,896,462 or U.S. Pat. No. 3,461,783. The mechanism in these prior devices is so complicated that assembling and adjustment of the camera takes much time, which is not profitable.

An object of the present invention is to provide an exposure control device free of the above mentioned shortcomings, not necessitating much space in the camera and affording ease for assembling and adjustment.

SUMMARY OF THE INVENTION

Thus in accordance with the present invention, the exposure calculating mechanism is formed as a unit and is arranged in the area of the lens mounting part of the camera where the exposure calculating mechanism unit can be operatively engaged with various adjusting means in a convenient way. In one embodiment, the calculating mechanism is provided along the side wall of a mirror box for a swingable finder mirror.

BRIEF DESCRIPTION OF THE DRAWINGS

The the present invention will now be described in accordance with the following accompanying drawings illustrating embodiments of the invention, in which FIG. 1 is a perspective view illustrating the relation of the arrangement of the interchangeable lens to the camera.

FIG. 2 is an exploded perspective view of the parts of the exposure calculating mechanism and FIG. 3 is a perspective view showing the relation of the follower pointer to the exposure meter.

DESCRIPTION OF THE INVENTION

In FIG. 1, 1 is the camera and 2 the interchangeable lens both shown in phantom. A shutter time dial 3 is provided on the upper surface of the camera and reference numeral 4 indicates the exposure calculating mechanisms. The interchangeable lens 2 can be of the conventional Bayonet system to be mounted on the camera by rotating a not shown securing ring to a predetermined position to the mount of the camera. The lens 2 has an aperture signal lever 5 to be engaged in a conventional aperture preset ring (not shown in the drawing) so as to be rotatable around the optical axis. A diaphragm closing lever 6 can be engaged with the diaphragm driving lever 9 at the side of the camera so as to be rotatable by a certain determined angular amount and a fixed aperture compensating pin 7 is carried at the rear end of the lens. A reflex mirror 52 is pivoted in a mirror box (not shown in the drawing) so as to be swung in association with the shutter release in a conventional way. The exposure calculating mechanism 4 is mounted flatly as a whole on two base plates 8, 8' opposed to each other with a small distance between them and mounted on the one external wall of the mirror box not having the mirror driving mechanism.

FIG. 2 shows the details of the exposure calculating mechanism in exploded perspective view. The exposure calculating mechanism is carried as a unit on the camera in a plane parallel to the optical axis and is located adjacent the lens mounting part of the camera. A cam plate 11 is operatively engaged with the shutter dial 3, being pivoted on the base plate 8' so as to be rotatable together with the pulley 12. A spring not shown in the drawing urges cam plate 4 and pulley 12 in the direction of arrow A.

A string 13 is fixed at one end to pulley 12 and the other end is fixed to a pulley 14 coupled with the film sensitivity dial 15. The shutter dial 3 is arranged so as to be rotatable coaxially with the dial 15 in a conventional manner. Film sensitivity is set by means of a relative rotation of the dial to the dial 15 while the shutter time is set when the dial 3 rotates with the dial 15 as an integral unit in such a manner that the rotation of the pulley 14 coupled with the dial 15 is transmitted to the cam plate 11 by means of the string 13. 16 and 17 are guide pulleys.

A slide plate 18 is supported by the base plate 8 so as to be slidable by means of a long slot hole and a pin (not shown in the drawing). Plate 18 has a cam follower pin 19 in contact with the cam 12 and a pin 20 extending from the other side of the slide plate.

A second slide plate 21 is supported by the base plate 8 so as to be slidable by means of the engagement of a pin into a long slot hole; and has pins 22 and 23 extending outwardly from it.

A third slide plate 24 is slidably supported by the base plate 8 in the same way as in case of the first and the second slide plates, and has a pin 25 extending outwardly from it.

A connecting plate 26 is pivoted on the slide plate 21 so as to be rotatable around the pin 23. A forked end of connecting plate 26 is engaged with the pin 20 on the first slide plate. A long slot at the other end of connecting plate 26 receives the pin 25 on the third slide plate 24 so as to connect slide plates 18 and 21 with each other.

A lever 27 is operatively engaged with the follower pointer, and is pivotally mounted at one end so as to be rotatable around the pin 30 on the connecting lever 29 which is pivotally mounted on the base plate by a pivot 28. The other end of lever 27 is engaged with the follower pointer lever 48 as is shown in FIG. 3. Pin 22 on the second slide plate 21 is engaged in the long slot hole in the middle of lever 27 in such a manner that the lever 27 is urged toward the right in the drawing by means of a spring 31. The third slide plate 24 is pulled toward the right by means of a spring 32.

The forked part on the one end of the connecting lever 29 is engaged with the pin 35 of the aperture compensating lever 34 which is pivoted on the base plate 8' by the pivot 33. The lever 34 has an arm 34a to be engaged with the aperture compensating pin 7 at the lens side, being urged along the clockwise direction by means of a spring 36 and stopped at a certain determined position in contact with the stop member 37.

38 is a lever which is operatively engaged with the diaphragm. Lever 38 has a bent part engaged with the aperture signal pin 5 of the lens, and is pivoted on a lever 40 rotatable around the pivot 39 fixed on the base plate 8' and urged upwards by means of a spring 46. A pin 41 is fixed on the lever 38 and is engaged with play in a hole provided in the arm of a middle lever 43. Lever 43 is fixed at one end of the pivot rotatably provided on the base plate 8' and mounted at the other end on pivot 42 to a conversion plate 44 having a pin 45 which engages an arm of the third slide plate 24. One end of the lever 38 is therefore operatively engaged with the diaphragm and carries out a nearly linear movement, when being urged along the direction of the arrow by means of the aperture signal pin 5. A follower pointer lever 48 and follower pointer 49 are provided as an integral body in engagement with lever 27 so as to be rotatable as explained above. The meter 50 of the exposure meter is provided in such a manner that the pointer 51 is rotatable concentrically with the follower pointer 49.

The the operation of how to determine the shutter time for a camera equipped with an interchangeable lens in accordance with the above described arrangement will now be explained in a system which places priority on aperture value.

At first the shutter dial 3 is set to an index, not shown in the drawing, and then the sensitivity of the film to be used is set at a notch on the shutter dial. Pulley 14 is thus rotated in accordance with a value corresponding to the sum of the shutter time and the film sensitivity so as to rotate the pulley 12 and the cam 11 by means of the string 13.

The pulley 12, as explained above, is urged along the direction of the arrow A by means of a spring, not shown in the drawing, to be in a position to follow the rotation of the dial 3 along any direction.

When the cam is rotated along the direction of the arrow A, the first slide plate 18 in contact with the cam 11 via the pin 19 is moved toward the left along the long slot hole, whereby the third slide plate 24 is urged to the right by means of a spring 32 while the arm is engaged with a pin 45 so that the connecting plate 26 is rotated around the pin 25 in such a manner that the second slide plate 21 connected with the connecting plate 26 by means of a pin 23 is also slid toward the left. In consequence the lever 27 operatively engaged with the follower pointer and connected to the second slide plate 21 is also rotated along the counterclockwise direction around the pivot 30, whereby the follower pointer 49 engaged with the lever 27 is rotated along the counterclockwise direction against the strength of the spring 47.

The pin 45 of the conversion plate 44 is stopped at a position corresponding to a certain predetermined aperture value so that when the shutter dial is rotated in the reverse direction so as to rotate the cam 11 in a direction opposite to that of the arrow A, the connecting plate 26 is rotated along the clockwise direction, whereby the follower pointer 49 is also rotated along the clockwise direction, being pulled by means of the spring 47. When the shutter dial is rotated until the follower pointer is brought into alignment with the pointer of the exposure meter, the shutter time is set corresponding to the brightness of the object to be photographed, the film sensitivity and the aperture value.

The operation to determine aperture value in a system with priority on shutter time will now be explained.

When the aperture preset ring of an interchangeable lens, not shown in the drawing, is rotated from the side at which the diaphragm is totally opened toward the side at which the diaphragm is closed in the state in which the shutter dial is set at an optional position, the aperture signal pin 5 operatively engaged with the aperture preset ring pushed down the lever 38 operatively engaged with the diaphragm at the side of the camera along the direction of the arrow against the strength of the spring 46. Along with the above the middle lever 43 connected by means of the pin 41 and the conversion plate 44 making one body with the lever 43 are rotated along the clockwise direction in such a manner that the pin 45 provided on the conversion plate 44 pushes the arm of the third slide plate 24 so as to move the slide plate 24 to the left against the strength of the spring. At this time the pin 19 of the first slide plate 18 is stopped in contact with the cam 11, being pulled by means of the spring 31 so that the connecting lever 26 is rotated around the pin 20 along the clockwise direction, whereby the lever 27 operatively engaged with the follower pointer is rotated around the pivot 30 in the counterclockwise direction, being operatively engaged with the second slide plate 21. Thus, when the follower pointer 49 is brought into alignment with the meter pointer 51, the aperture value is preset in accordance with the brightness of the object to be photographed, the film sensitivity and the set shutter time.

Below the operation of the aperture compensating lever 34 will be explained.

The aperture compensating pin 7 of the interchangeable lens is designed to have a length corresponding to the deviation of the light measurement of the exposure meter due to the aperture value of the totally opened diaphragm of the lens in such a manner that when the interchangeable lens is mounted on the camera, the aperture compensating pin 7 is engaged with the arm 34a of the aperture compensating lever 34 so as to push the lever 34 along the direction of the arrow, whereby the lever 34 is rotated around the pivot 33 along the counterclockwise direction in accordance with the length of the aperture compensating pin 7. Thus, the lever 29 in engagement with the pin 35 on the lever 34 is rotated around the pivot 28 along the clockwise direction so as to translate the position of the support point 30 of the lever 27 operatively engaged with the follower pointer so that the operatively engaged lever 27 is rotated around the pin 22 along the clockwise direction so as to change the position of the follower pointer. Thus, in case the follower pointer is brought into alignment with the meter pointer by means of the aforementioned operation, when the shutter dial or the aperture preset ring is moved the follower pointer is brought into alignment with the meter pointer, being rotated more (or less) by the amount corresponding to the difference of the scaling angle of the meter pointer in such a manner that the exposure value is set, being properly compensated.

The above explanation is for the light measurement with a totally opened diaphragm, while the light measurement is carried out with the closed diaphragm when the interchangeable lens has no aperture signal lever. Hereby the follower pointer is operatively engaged only with the shutter dial so that in order to determine the aperture the diaphragm is actually closed so as to change the amount of the light incident to the exposure meter in such a manner that the meter pointer is brought into alignment with the follower pointer at the position corresponding to the set shutter time.

As explained above in accordance with the present invention an exposure calculating mechanism having a follower pointer is arranged at a position closest to the aperture signal lever of the interchangeable lens, the aperture compensating pin and so on so that the lens can directly be operatively engaged with the calculating device without any complicated intermediate engaging mechanism. The mechanical member can therefore be arranged flatly at one place so that the space for such members can be economized while simplifying the assembling work.

What is claimed is:

1. An exposure condition defining device for a single lens reflex camera for determining the exposure value, having a follower pointer system and having means for accommodating interchangeable lenses with different maximum aperture values, said means for accommodating interchangeable lenses including a lens mounting part, a base plate adjacent said lens mounting part, an aperture preset device, an exposure meter for measuring the amount of the light penetrating an interchangeable lens mounted on said camera with a totally opened diaphragm, said exposure meter having a follower pointer, a shutter time setting means, and a film sensitivity setting means, said exposure condition defining device comprising an exposure calculating mechanism carried as a unit assembly on said base plate of said camera in a plane parallel to the optical axis and located in the area of the lens mounting part of the camera, said calculating mechanism including a first member movable in response to the shutter time setting means and the film sensitivity setting means, a second member movable in response to the aperture preset means, a third member having a lever pivotally provided thereon and said third member interlinked to said first and second members to cause, in response to the movement of said first and second members, the follower pointer of the exposure meter to move through said lever which is interlocked with said follower pointer, and a compensating means coupled to said lever and arranged to engage a signal member of said interchangeable lens and to change the position thereof to shift the fulcrum of said lever in accordance with the full open F member of said interchangeable lens.

2. An exposure condition defining device in accordance with claim 1, wherein said camera has a housing and an external wall of a mirror box, said exposure calculating mechanism unit is provided between the external wall of the mirror box in the camera and the camera housing.

3. An exposure condition defining device according to claim 1, wherein said exposure meter is disposed in the upper part of the camera and includes a pointer; said follower pointer is rotatably supported below said exposure meter coaxially with the pointer thereof; said first, second and third members of said calculating mechanism, said compensating means and said lever which moves in response to said follower pointer are carried to be movable in parallel with said base plate and are arranged to cross the follower pointer perpendicularly thereto in such a way as to transmit the rotation thereof to said follower pointer.

4. An exposure condition defining device for a single lens reflex camera for determining the exposure value, having a follower pointer system and having means for accommodating interchangeable lenses with different maximum aperture values, an aperture preset device, an exposure meter for measuring the amount of the light penetrating an interchangeable lens mounted on said camera with a totally opened diaphragm, a shutter time setting means, and a film sensitivity setting means, a support member in said camera, said exposure condition defining device comprising an exposure calculating mechanism carried as a unit assembly on said support member in said camera including a first member movable in response to the shutter time setting means and the film sensitivity setting means, a second member movable in response to the aperture present means, and a third member to be translated in accordance with the movement of the first and second members so as to move the follower pointer of the exposure meter, an external wall of a housing for containing a reflex mirror in the camera, and said exposure calculating mechanism carried along said external wall.

* * * * *